(12) United States Patent
Karasawa (10) Patent No.: US 11,982,574 B2
(45) Date of Patent: May 14, 2024

(54) PROTECTION SYSTEM FOR ELECTROMAGNETIC RELAY

(71) Applicant: SUBARU CORPORATION, Tokyo (JP)

(72) Inventor: Yukio Karasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 114 days.

(21) Appl. No.: 17/875,039

(22) Filed: Jul. 27, 2022

(65) Prior Publication Data

US 2023/0081030 A1   Mar. 16, 2023

(30) Foreign Application Priority Data

Sep. 14, 2021   (JP) .................. 2021-149651

(51) Int. Cl.
*G01K 3/00* (2006.01)
*H02H 5/04* (2006.01)

(52) U.S. Cl.
CPC ............. *G01K 3/005* (2013.01); *H02H 5/042* (2013.01)

(58) Field of Classification Search
CPC .............................. G01K 3/005; H02H 5/042
USPC ........................................................ 340/584
See application file for complete search history.

(56) References Cited

U.S. PATENT DOCUMENTS

| | | | | |
|---|---|---|---|---|
| 3,737,749 A | * | 6/1973 | Schmit | G09F 17/00 318/472 |
| 3,774,406 A | * | 11/1973 | Reitblatt | F25D 21/14 62/278 |
| 4,297,852 A | * | 11/1981 | Brooks | F25D 21/006 62/155 |
| 4,439,995 A | * | 4/1984 | McCarty | F25D 21/002 62/282 |
| 2006/0175352 A1 | * | 8/2006 | Emmendorfer | B08B 9/0325 222/1 |
| 2007/0261896 A1 | * | 11/2007 | Shaffer | B60L 8/003 180/2.2 |
| 2008/0087238 A1 | * | 4/2008 | Held | F01P 7/165 165/104.19 |

(Continued)

FOREIGN PATENT DOCUMENTS

| | | | |
|---|---|---|---|
| JP | 2007165406 | * | 12/2005 |
| JP | 2007-165406 A | | 6/2007 |

*Primary Examiner* — Kerri L McNally
*Assistant Examiner* — Thang D Tran
(74) *Attorney, Agent, or Firm* — MCGINN I.P. LAW GROUP, PLLC (57) ABSTRACT

A protection system for an electromagnetic relay mounted on a vehicle is configured to protect the electromagnetic relay from causing a coupling failure due to freezing of the electromagnetic relay. The system includes a temperature detector, a cooler, and a control unit. The temperature detector sequentially measures an ambient temperature of a location in which the electromagnetic relay is disposed and outputs information on a change in the ambient temperature. The cooler cools an electric power line coupled to a fixing terminal of the electromagnetic relay. The control unit activates the cooler to cool the electric power line in a case where the control unit determines that the electromagnetic relay has a possibility of freezing on the basis of the information on the change in the ambient temperature from the temperature detector.

9 Claims, 4 Drawing Sheets

(56) References Cited

U.S. PATENT DOCUMENTS

| | | | |
|---|---|---|---|
| 2009/0266807 A1* | 10/2009 | Valliappan | F27D 21/00 |
| | | | 219/391 |
| 2017/0159545 A1* | 6/2017 | Onishi | B60K 11/02 |
| 2018/0361828 A1* | 12/2018 | Kato | F25B 6/04 |
| 2019/0078497 A1* | 3/2019 | Enomoto | F01P 11/029 |
| 2020/0392922 A1* | 12/2020 | Krebs | F02G 5/04 |
| 2020/0408452 A1* | 12/2020 | Alexander | F25D 16/00 |

* cited by examiner

PROTECTION SYSTEM FOR ELECTROMAGNETIC RELAY

CROSS-REFERENCE TO RELATED APPLICATIONS

The present application claims priority from Japanese Patent Application No. 2021-149651 filed on Sep. 14, 2021, the entire contents of which are hereby incorporated by reference.

BACKGROUND

The technology relates to a protection system for an electromagnetic relay, in particular, a protection system for an electromagnetic relay that reduces the occurrence of conduction failures at contacts due to freezing.

Electromagnetic relays have been widely used as switching means for supplying electric power to apparatuses, devices, and other components to activate electronic devices, power apparatuses, and vehicles, for example. The electromagnetic relay accommodates, for example, a fixing terminal for coupling circuitry, a movable terminal, and an exciting coil for moving the movable terminal. The electromagnetic relay is configured to couple the circuitry, e.g., couple a power source to an electric load by supplying a voltage to the exciting coil to bring the movable terminal into contact with the fixing terminal.

Inside the electromagnetic relay having such a configuration, water vapor is generated upon heating the exciting coil or contacts of the terminals. The water vapor is condensed and frozen on the fixing terminal when an ambient temperature drops below freezing. This can cause a conduction failure at the contacts between the terminals.

Figure 5:
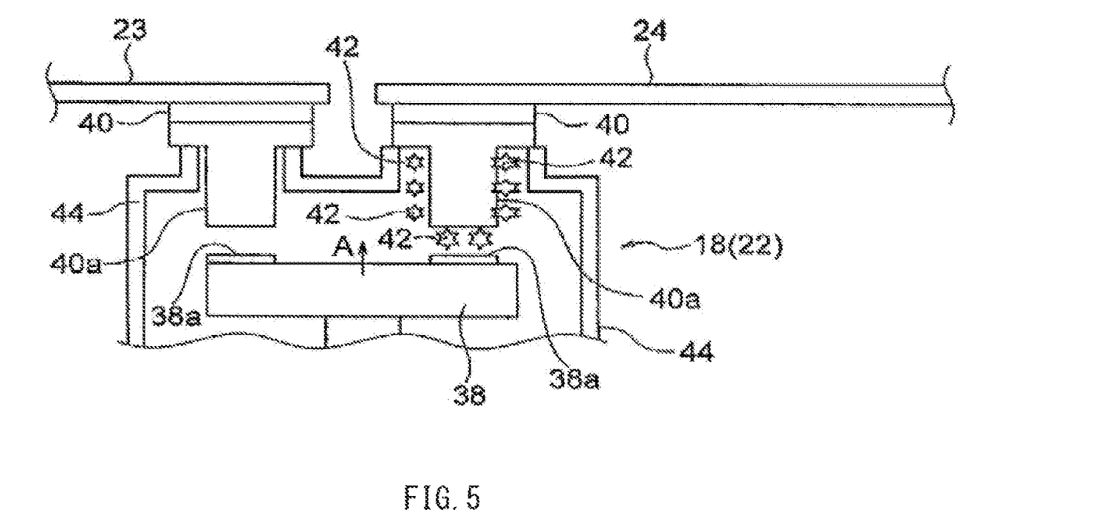
FIG. 5 is a diagram illustrating an existing electromagnetic relay having a conduction failure due to freezing of the electromagnetic relay.

FIG. 5 illustrates a conduction failure caused by freezing of contacts of an electromagnetic relays 18 or 22. The electromagnetic relays 18 and 22 may each have fixing terminals 40 to which electric power lines, such as bus bars 23 and 24 are coupled. Supplying a voltage to an exciting coil (not illustrated) moves a movable terminal 38 toward the fixing terminals 40 in a direction indicated by an arrow A, so that contacts 38a of the movable terminal 38 are brought into contact with contacts 40a of the fixing terminals 40.

The exciting coil is heated by the voltage supply, and the contacts of the terminals are heated upon energizing. This generates water vapor inside a housing 44. If the ambient temperature of a location in which the electromagnetic relay is disposed drops in this situation, the water vapor is condensed on the entire faces of the contacts 40a. If the ambient temperature further drops below freezing, the condensations of the water vapor are frozen into ice particles 42, which causes a conduction failure. That is, the ice particles 42 generated by freezing between the contacts 38a of the movable terminal 38 and the contacts 40a of the fixing terminals 40 causes a conduction failure between the contacts 40a of the fixing terminals 40 and the contacts 38a of the movable terminal 38.

To address such a concern about freezing, Japanese Unexamined Patent Application Publication (JP-A) No. 2007-165406 discloses an electromagnetic relay including a vibration generation means for vibrating a housing or a frozen portion inside the housing of the electromagnetic relay. In a case where it is determined that a portion inside the housing of the electromagnetic relay is frozen, the vibration generated by the vibration generation means is transmitted to the fixing terminals or other components to remove the frozen portion.

SUMMARY

An aspect of the technology provides a protection system for an electromagnetic relay mounted on a vehicle. The protection system is configured to protect the electromagnetic relay from causing a coupling failure due to freezing of the electromagnetic relay. The system includes a temperature detector, a cooler, and a control unit. The temperature detector is configured to sequentially measure an ambient temperature of a location in which the electromagnetic relay is disposed and output information on a change in the ambient temperature. The cooler is configured to cool an electric power line coupled to a fixing terminal of the electromagnetic relay. The control unit is configured to activate the cooler to cool the electric power line in a case where the control unit determines that the electromagnetic relay has a possibility of freezing on the basis of the information on the change in the ambient temperature from the temperature detector.

An aspect of the technology provides a protection system for an electromagnetic relay mounted on a vehicle. The protection system is configured to protect the electromagnetic relay from causing a coupling failure due to freezing of the electromagnetic relay. The system includes a temperature detector, a cooler, and circuitry. The temperature detector is configured to sequentially measure an ambient temperature of a location in which the electromagnetic relay is disposed and output information on a change in the ambient temperature. The cooler is configured to cool an electric power line coupled to a fixing terminal of the electromagnetic relay. The circuitry is configured to activate the cooler to cool the electric power line in a case where the circuitry determines that the electromagnetic relay has a possibility of freezing on the basis of the information on the change in the ambient temperature from the temperature detector.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

The method disclosed in JP-A No. 2007-165406 needs, for example, an additional motor to generate vibration, which can increase the costs for the electromagnetic relay. Additionally, the generated vibration can adversely affect peripheral components.

One concern about the method disclosed in JP-A No. 2007-165406 is that the method takes time to eliminate a conduction failure due to freezing and thus makes it difficult to turn on the electromagnetic relay immediately.

It is desirable to provide a protection system for an electromagnetic relay that addresses concerns about freezing of the electromagnetic relay with a simple configuration.

In the following, a protection system for an electromagnetic relay according to an example embodiments of the technology is described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 1:
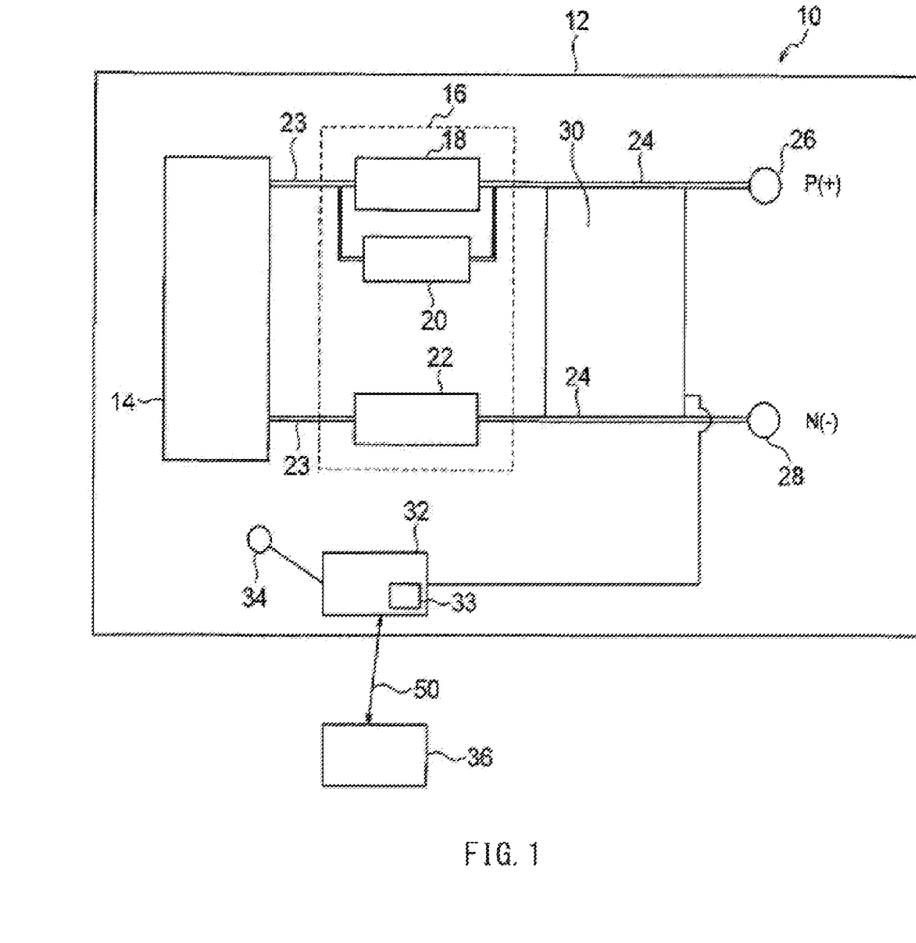
FIG. 1 is a block diagram illustrating a schematic configuration of a protection system for an electromagnetic relay according to one example embodiment of the technology.

FIG. 1 illustrates a schematic configuration of a protection system 10 for an electromagnetic relay according to an example embodiment of the technology. The protection system 10 may include a battery pack 12 and an external unit 36. The battery pack 12 may accommodate a battery 14, a junction box 16, a control unit 32, and other components. The external unit 36 may be coupled to the control unit 32 via an in-vehicle network 50.

The battery pack 12 may further accommodate a temperature detector 34, a positive electrode-side terminal 26, and a negative electrode-side terminal 28. The junction box 16 may accommodate an electromagnetic relay 18 on a positive electrode side, an electromagnetic relay 22 on a negative electrode side, and a pre-charge relay 20. The electromagnetic relay 18 on the positive electrode side may be coupled to a positive electrode of the battery 14 with an electric power line, such as a bus bar 23. The electromagnetic relay 22 on the negative electrode side may be coupled to a negative electrode of the battery 14 with an electric power line, such as the bus bar 23.

Likewise, the electromagnetic relay 18 on the positive electrode side inside the junction box 16 may be coupled to the positive electrode-side terminal 26 with a bus bar 24, and the electromagnetic relay 22 on the negative electrode side inside the junction box 16 may be coupled to the negative electrode-side terminal 28 with the bus bar 24. The bus bars 23 and 24 may include the same material but have different lengths.

The battery pack 12 may further include a cooler 30. The cooler 30 may be, for example, a Peltier device. In this example embodiment, the cooler 30 is configured to cool the bus bar 24 between the electromagnetic relay 18 on the positive electrode side and the positive electrode-side terminal 26, and the bus bar 24 between the electromagnetic relay 22 on the negative electrode side and the negative electrode-side terminal 28.

The temperature detector 34 measures a temperature inside the battery pack 12, i.e., an ambient temperature of the location in which the electromagnetic relays 18 and 22 are disposed. The temperature detector 34 may start the measurement at predetermined measurement start time, measure the temperature at predetermined time intervals, and store the measured temperatures. The control unit 32 is configured to communicate with the external unit 36 via the in-vehicle network 50, and receive weather forecast information including information on information on forecasted temperatures. The weather forecast information received by the control unit 32 may be stored in a weather information storage 33. The control unit 32 is further configured to determine whether the electromagnetic relays 18 and 22 will reach a freezing temperature, refer to the measured temperatures stored in the temperature detector 34, and control the cooler 30, for example.

Figure 2:
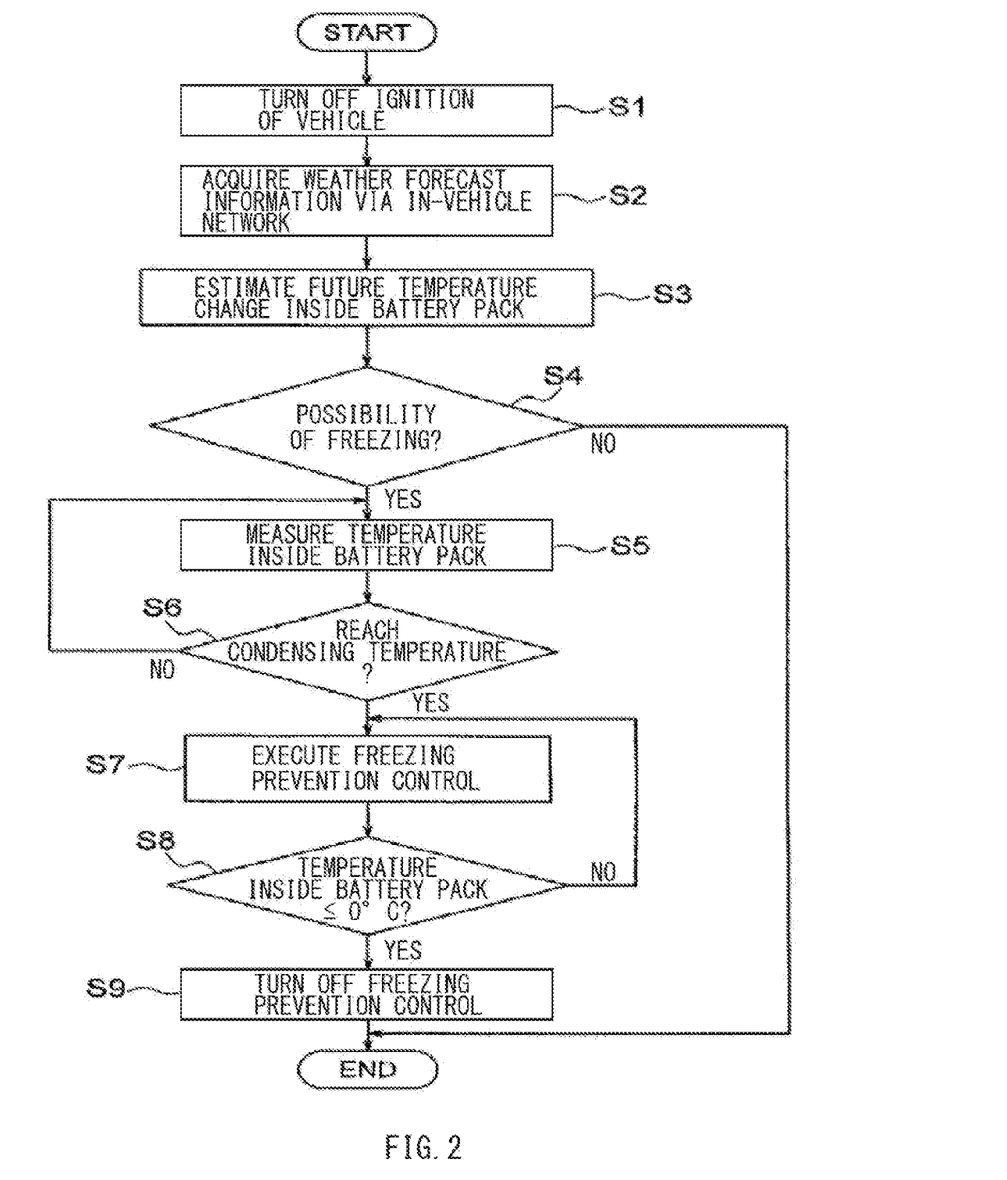
FIG. 2 is a flowchart of a control process performed by the protection system according to one example embodiment of the technology.

FIG. 2 is a flowchart of a method of controlling the electromagnetic relay according to an example embodiment of the technology. In this example embodiment, the determination as to whether the electromagnetic relay will freeze is made on the basis of information on an actual temperature change of the electromagnetic relay and information on an estimated future temperature change of the electromagnetic relay based on the weather forecast information.

The control flow may start with turning off an ignition of a vehicle after use of the vehicle (Step S1). For example, in a case where it is estimated that the electromagnetic relay will freeze in the next morning after use of the vehicle in a cold area, the control to prevent the freezing may be performed during the night so that the vehicle will be available immediately in the next early morning without suffering from a conduction failure of the electromagnetic relay.

Returning to the flowchart in FIG. 2, the control unit 32 may acquire the weather forecast information, such as a weather report, from the external unit 36 via the in-vehicle network 50 (Step S2), and store the weather forecast information on the weather information storage 33. The weather forecast information includes information on forecasted temperatures for an area where the vehicle is parked. The control unit 32 may estimate a future temperature change inside the battery pack 12 on the basis of the temperatures measured by the temperature detector 34 (Step S3). The control unit 32 may estimate the future temperature change inside the battery pack 12 on the basis of a series of temperatures measured by the temperature detector 34 until the present time.

Figure 3:
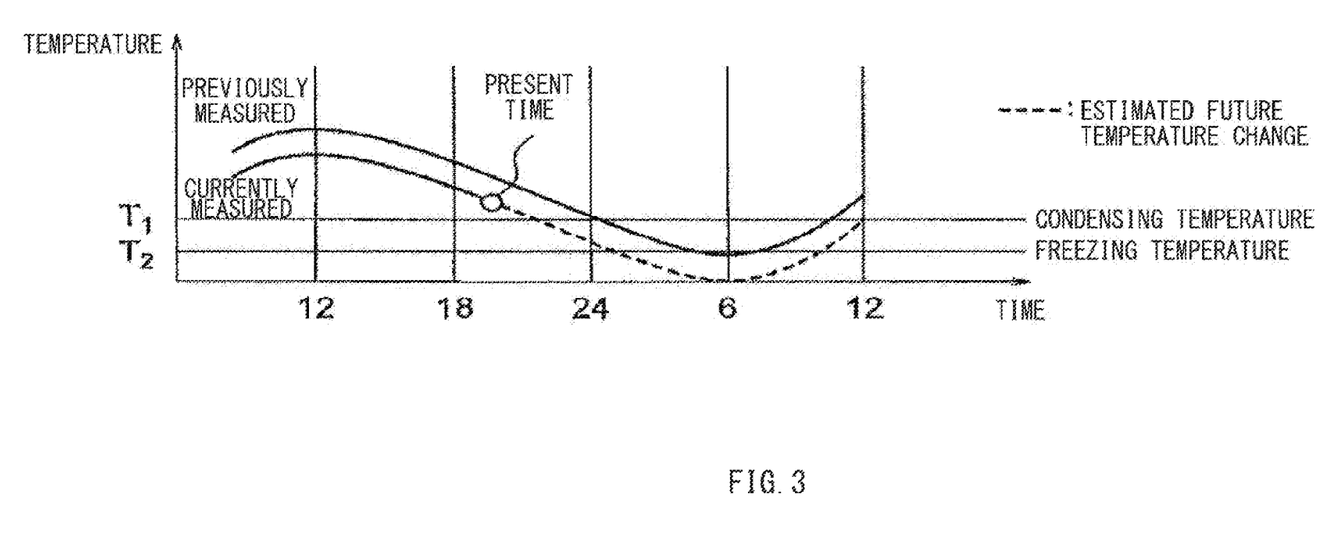
FIG. 3 is a chart illustrating a future temperature change estimated by the protection system according to one example embodiment of the technology.

FIG. 3 is a chart illustrating the future temperature change estimated by the protection system according to the example embodiment of the technology. The chart has a horizontal axis representing time and a vertical axis representing temperature. The chart has two curves: the upper one may indicate an actual temperature change (actually measured values) within a day measured when the vehicle was previously used, and the lower one may indicate the temperature change measured within a day measured when the vehicle is currently used, for example. The lower curve may include a solid line indicating temperatures measured at and before the present time (indicated by a circle), and a broken line indicating estimated temperatures after the present time. That is, the broken line may indicate the estimated future temperature change of the electromagnetic relay after the present time. The vertical axis defines a condensing temperature T1 at which the electromagnetic relays 18 and 22 start causing condensation, and a freezing temperature T2 at which the electromagnetic relays 18 and 22 start freezing.

As described above, the control unit 32 may estimate the future temperature change of the electromagnetic relay on the basis of the series of temperatures measured by the temperature detector 34 until the present time. The control unit 32 may estimate the future temperature change of the electromagnetic relay by using artificial intelligence (AI) or calculating a regression curve of the measured temperatures, for example. The temperature estimation illustrated in FIG. 3 indicates the temperature of the electromagnetic relay will reach the condensing temperature T1 or below and the freezing temperature T2 or below.

Returning to the flowchart in FIG. 2, the control unit 32 may determine whether the temperatures of the electromagnetic relays 18 and 22 will reach the freezing temperature T2. That is, the control unit 32 may assess the possibility of freezing of the electromagnetic relays 18 and 22 (Step S4). The determination may be made on the basis of the estimated future temperature change illustrated in FIG. 3 and the weather information received from the external unit 36. For example, in a case where the freezing of the electromagnetic relays 18 and 22 is estimated on the basis of the information on the actual temperature change, the control unit 32 may determine that there is a possibility of freezing of the electromagnetic relays 18 and 22. Further, even in a case where the temperatures of the electromagnetic relays 18 and 22 are not estimated to reach the freezing temperature T2 on the basis of the information on the actual temperature change, the control unit 32 may determine that the electromagnetic relays 18 and 22 have a possibility of freezing if a sudden drop in temperature is estimated according to the weather forecast information.

If the control unit 32 determines that there is no possibility of freezing (Step S4: NO), the flow may end. In contrast, if the control unit 32 determines that there is the possibility of freezing (Step S4: YES), the temperature inside the battery pack 12 may be measured (Step S5). When the temperatures of the electromagnetic relays 18 and 22 reach the condensing temperature T1, that is, when a temperature condition for causing condensation is satisfied (Step S6: YES), freezing prevention control may be executed (Step S7).

The condensing temperature T1 may change depending on the volume of the housing of the electromagnetic relay, the amount of moisture in the housing, the heating temperature of the exciting coil, and other factors. However, in this example embodiment, the condensing temperature T1 may be a predetermined temperature determined through an experiment or analysis, for example.

In the freezing prevention control in Step S7, the cooler 30 may cool the bus bars 24 inside the battery pack 12. When the temperature inside the battery pack 12 reaches a temperature below zero, e.g., −5° C. during the cooling (Step S8: YES), the freezing prevention control may be turned off (Step S9). Thereafter, the flow may end.

If the temperature inside the battery pack 12 does not reach the condensing temperature T1, that is, if the temperature condition for causing condensation is not satisfied (Step S6: NO), the process may return to Step S5 in which the temperature inside of the battery pack 12 is measured. In a case where the temperature inside the battery pack 12 does not decrease to the condensing temperature T1 (Step S6: NO), the process may repeat a loop including Steps S5 and S6. However, when the temperature inside the battery pack 12 reaches the condensing temperature T1 afterwards (Step S6: YES), the freezing prevention control may be executed. Thus, the loop of the process is prevented from being repeated endlessly. Alternatively, in consideration of cases where the electromagnetic relays will no longer have the possibility of freezing or the temperature condition for causing condensation will not be satisfied due to a change in the ambient temperature, Steps S5 and S6 may be executed only for a predetermined time period before the flow ends.

In the freezing prevention control, the bus bars 24 may be cooled in a temperature gradient from 10° C. per hour to 40° C. per hour. An optimal temperature gradient may change depending on the sizes and other specifications of the electromagnetic relay; however, the temperature gradient within the range from 10° C. per hour to 40° C. per hour generally yields favorable results. This cooling efficiently causes condensation and freezing on a base end of the fixing terminal.

Figure 4:
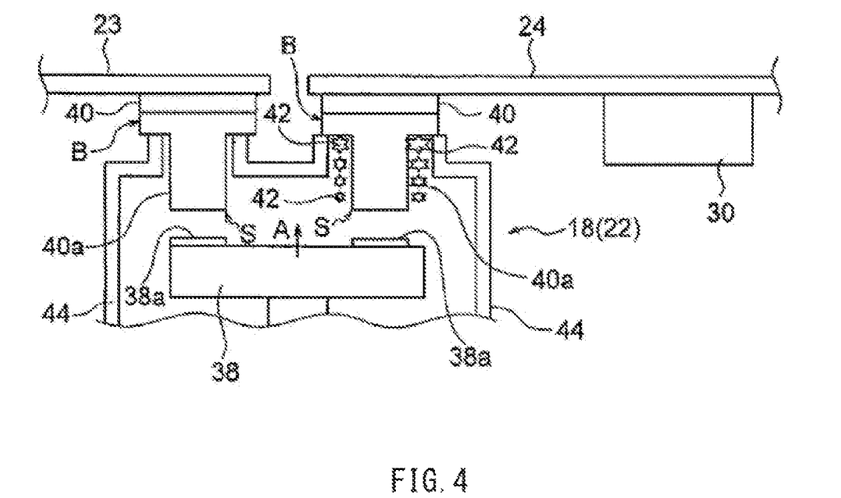
FIG. 4 is a diagram illustrating a method of eliminating a conduction failure executed by the protection system according to one example embodiment of the technology.

FIG. 4 illustrates an effect of the protection system according to the example embodiment of the technology. As described above, the bus bars 24 are cooled by the cooler 30 in a case where the electromagnetic relays 18 and 22 have the possibility of freezing, and where the temperature inside the battery pack 12 decreases to the condensing temperature T1.

The bus bar 24 may be, for example, a copper plate having high heat conductivity. Thus, a base end B of the fixing terminal 40 coupled to the bus bar 24 at the contact 40a may be cooled first, and then condensation may be caused on the base end B. The amount of moisture inside the housing 44 of each of the electromagnetic relays 18 and 22 may be substantially constant. Accordingly, if the amount of condensation generated on the base end B coupled to the bus bar 24 is large, the amount of condensation generated on a leading end S of the contact 40a of the fixing terminal 40, i.e., a side of the contact 40a of the fixing terminal 40 adjacent to the movable terminal 38, is relatively small. That is, the bus bar 24 may be cooled in a sharper temperature gradient than in natural cooling so that a large amount of condensation is generated on the base end B of the contact 40a of the fixing terminal 40, while a small amount of condensation is generated on the leading end S of the contact 40a of the fixing terminal 40.

In a case where the ambient temperature reaches the freezing temperature T2 in this state, substantially no condensation is generated on the leading end S of the contact 40a of the fixing terminal 40. Thus, the contact 38a of the movable terminal 38 is properly brought into contact with the contact 40a of the fixing terminal 40. That is, no ice particle 42 that hinders electric conduction is present between the contact 40a of the fixing terminal 40 and the contact 38a of the movable terminal 38, causing no conduction failure.

In the exemplary configuration illustrated in FIG. 1, no additional cooler is provided to cool the bus bars 23 coupling the battery 14 and the electromagnetic relays 18 and 22. One reason for this is that the bus bars 23 are unlikely to be frozen because the bus bars 23 are longer than the bus bars 24 coupling the electromagnetic relay 18 to the positive electrode-side terminal 26 and the electromagnetic relay 22 to the negative electrode-side terminal 28. However, an additional cooler 30 may be provided to cool the bus bars 23 in another example embodiment.

According to the example embodiments of the protection system, the bus bars 24 are cooled in a case where it is estimated that the electromagnetic relays 18 and 22 have the possibility of freezing on the basis of the measured ambient temperatures of the location in which the electromagnetic relays 18 and 22 are disposed. When the bus bar 24 is cooled, a large amount of condensation may be generated on the base end B coupled to the bus bar 24, while a relatively small amount of condensation may be generated on the leading end S to come into contact with the contact 38a of the movable terminal 38.

Accordingly, even if the electromagnetic relays 18 and 22 are frozen after a temperature drop, no ice particle 42 that causes a conduction failure is generated at the contacts between the fixing terminal 40 and the movable terminal 38, allowing the electromagnetic relays 18 and 22 to be turned on immediately.

It should be understood that the technology should not be limited to the example embodiments described above and may be modified in various ways without departing from the gist of the technology. For example, the cooler 30 may be a Peltier device in the example embodiments described above; however, the cooler 30 may be another device than the Peltier device. Additionally, only portions of the bus bars 24 extending from the positive electrode-side terminal 26 to the junction box 16 and from the negative electrode-side terminal 28 to the junction box 16 are cooled in the example embodiments described above; however, the entire portions of the bus bars 24 may be cooled in another example embodiment.

According to the example embodiments of the technology, in a case where it is estimated that the ambient temperature of the electromagnetic relay not being frozen now will reach the freezing temperature, the electric power line coupled to the fixing terminal of the electromagnetic relay is cooled to prevent the contacts between the fixing terminal and the movable terminal of the electromagnetic relay from freezing. This helps to prevent a coupling failure from occurring. That is, the electric power line is coupled to the base end of the fixing terminal of the electromagnetic relay, and the base end is opposite to the end portion of the fixing terminal to come into contact with the movable terminal.

The base end of the fixing terminal is cooled in a sharper temperature gradient than in natural cooling by cooling the electric power line by the cooler. This causes condensation and freezing to be generated concentratedly on the base end of the fixing terminal. That is, the end portion of the fixing terminal to come into contact with the movable terminal is surely less likely to cause condensation or freezing, as compared with the case where the end portion of the fixing terminal is cooled by a natural temperature drop. Accordingly, it is possible to address the concern about the conduction failure due to freezing.

According to at least one example embodiment of the technology, the determination as to whether the electromagnetic relays have the possibility of freezing may be made on the basis of both the information on the actual temperature change of the electromagnetic relays and the information on the estimated future temperature change based on the weather forecast information. This further ensures the protection effect. For example, in a case where the freezing is estimated on the basis of the information on the actual temperature change, the cooling operation on the electric power line may be started immediately. Further, even in a case where it is not determined that the temperature of the electromagnetic relay will reach the freezing temperature on the basis of the information on the actual temperature change, the cooling operation may be executed if a sudden drop in temperature due to a sudden change in weather is estimated on the basis of the weather forecast information. Accordingly, it is possible to protect the electromagnetic relay with higher stability in consideration of the weather forecast information.

According to at least one example embodiment of the technology, the cooler may be operated when it is determined that the electromagnetic relay has the possibility of freezing and that a temperature of the electromagnetic relay satisfies the temperature condition for causing condensation. In other words, the cooler may be operated only when the possibility of condensation and freezing of the condensation is high. No coupling failure due to freezing is caused as long as no condensation is generated in the electromagnetic relay. Accordingly, it is possible to execute the cooling operation on the electric power lines only as actually needed.

According to at least one example embodiment of the technology, the cooling operation may be executed in the temperature gradient in the range of 10° C. per hour to 40° C. per hour, which is sharper than a natural drop in ambient temperature. This effectively causes condensation and freezing to be generated concentratedly on the base end of the fixing terminal. That is, a large amount of condensation and freezing is generated on the base end of the fixing terminal, whereas the amount of condensation and freezing generated on the end portion to come into contact with the movable terminal is effectively reduced. Accordingly, it is possible to surely prevent the conduction failure due to freezing from occurring.

According to the example embodiments of the technology, in a case where it is determined that the electromagnetic relay has the possibility of freezing, the protection system for the electromagnetic relay cools the electric power line coupled to the fixing terminal so that the temperature at the base end of the fixing terminal is lower than the temperature at the leading end of the fixing terminal to come into contact with the movable terminal. This effectively prevents the leading end to come into contact with the movable terminal from freezing, and addresses the concern about the conduction failure of the electromagnetic relay. Accordingly, it is possible to provide the electromagnetic relay with high reliability and ensure the performance of a vehicle including the electromagnetic relay.

The control unit 32 in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control unit 32. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control unit 32.

The invention claimed is:

1. A protection system for an electromagnetic relay mounted on a vehicle, the protection system being configured to protect the electromagnetic relay from causing a coupling failure due to freezing of the electromagnetic relay, the protection system comprising:
   a temperature detector configured to sequentially measure an ambient temperature of a location in which the electromagnetic relay is disposed and output information on a change in the ambient temperature;

a cooler configured to cool an electric power line coupled to a fixing terminal of the electromagnetic relay; and a control unit configured to activate the cooler to cool the electric power line in a case where the control unit determines that the electromagnetic relay has a possibility of freezing on a basis of the information on the change in the ambient temperature from the temperature detector.

2. The protection system according to claim 1, further comprising a weather information storage configured to receive weather forecast information including information on forecasted temperatures, wherein the control unit is configured to determine the possibility of freezing of the electromagnetic relay by making an estimation on a future temperature change on a basis of the information on the change in the ambient temperature sequentially measured by the temperature detector from predetermined measurement start time to present time and information on an estimated future temperature change based on the weather forecast information, and determining whether a temperature of the electromagnetic relay will reach a freezing temperature on a basis of the estimation.

3. The protection system according to claim 1, wherein the control unit is configured to activate the cooler in a case where the control unit determines that the electromagnetic relay has the possibility of freezing and that the temperature of the electromagnetic relay satisfies a temperature condition for causing condensation.

4. The protection system according to claim 2, wherein the control unit is configured to activate the cooler in a case where the control unit determines that the electromagnetic relay has the possibility of freezing and that the temperature of the electromagnetic relay satisfies a temperature condition for causing condensation.

5. The protection system according to claim 1, wherein the cooler is configured to cool the electric power line in a temperature gradient in a range of 10° C. per hour or greater and 40° C. per hour or less.

6. The protection system according to claim 2, wherein the cooler is configured to cool the electric power line in a temperature gradient in a range of 10° C. per hour or greater and 40° C. per hour or less.

7. The protection system according to claim 3, wherein the cooler is configured to cool the electric power line in a temperature gradient in a range of 10° C. per hour or greater and 40° C. per hour or less.

8. The protection system according to claim 4, wherein the cooler is configured to cool the electric power line in a temperature gradient in a range of 10° C. per hour or greater and 40° C. per hour or less.

9. A protection system for an electromagnetic relay mounted on a vehicle, the protection system being configured to protect the electromagnetic relay from causing a coupling failure due to freezing of the electromagnetic relay, the protection system comprising:

a temperature detector configured to sequentially measure an ambient temperature of a location in which the electromagnetic relay is disposed and output information on a change in the ambient temperature;

a cooler configured to cool an electric power line coupled to a fixing terminal of the electromagnetic relay; and circuitry configured to activate the cooler to cool the electric power line in a case where the circuitry determines that the electromagnetic relay has a possibility of freezing on a basis of the information on the change in the ambient temperature from the temperature detector.

\* \* \* \* \*